No. 851,791. PATENTED APR. 30, 1907.
V. G. APPLE.
MACHINE FOR PACKING POWDERED OR MASTIC MATERIAL.
APPLICATION FILED NOV. 6, 1905.

7 SHEETS—SHEET 1.

Witnesses:
Harry R. L. White
Ray White

Inventor:
Vincent G. Apple
By Foree Bain and May
Attys.

No. 851,791. PATENTED APR. 30, 1907.
V. G. APPLE.
MACHINE FOR PACKING POWDERED OR MASTIC MATERIAL.
APPLICATION FILED NOV. 6, 1905.

7 SHEETS—SHEET 2.

No. 851,791. PATENTED APR. 30, 1907.
V. G. APPLE.
MACHINE FOR PACKING POWDERED OR MASTIC MATERIAL.
APPLICATION FILED NOV. 6, 1905.

7 SHEETS—SHEET 3.

No. 851,791. PATENTED APR. 30, 1907.
V. G. APPLE.
MACHINE FOR PACKING POWDERED OR MASTIC MATERIAL.
APPLICATION FILED NOV. 6, 1905.

7 SHEETS—SHEET 4.

No. 851,791. PATENTED APR. 30, 1907.
V. G. APPLE.
MACHINE FOR PACKING POWDERED OR MASTIC MATERIAL.
APPLICATION FILED NOV. 6, 1905.

7 SHEETS—SHEET 6.

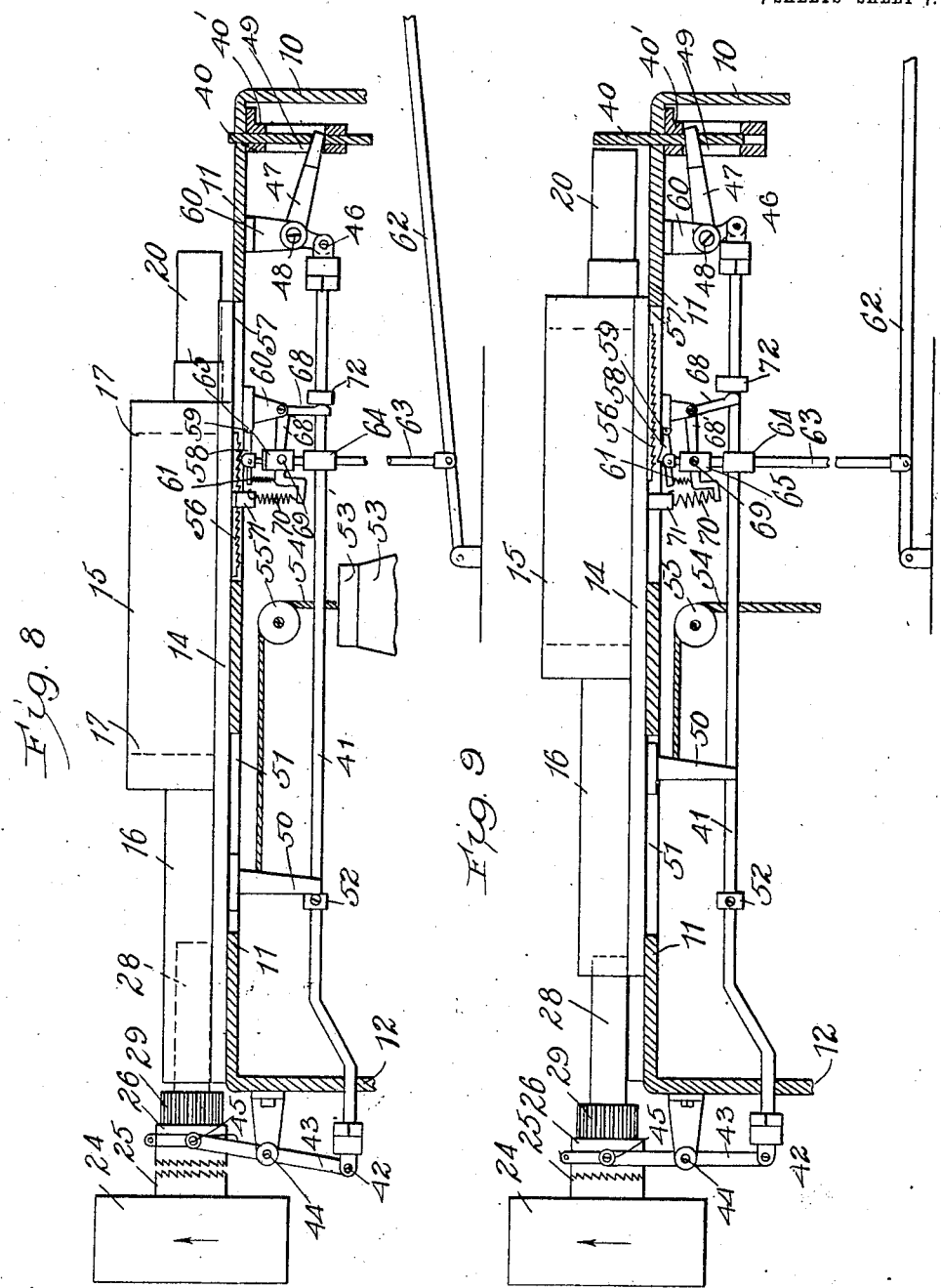

UNITED STATES PATENT OFFICE.

VINCENT G. APPLE, OF DAYTON, OHIO.

MACHINE FOR PACKING POWDERED OR MASTIC MATERIAL.

No. 851,791.  Specification of Letters Patent.  Patented April 30, 1907.

Application filed November 6, 1905. Serial No. 286,091.

*To all whom it may concern:*

Be it known that I, VINCENT G. APPLE, a citizen of the United States, residing at Dayton, in the county of Montgomery and State of Ohio, have invented certain new and useful Improvements in Machines for Packing Powdered or Mastic Material, of which the following is a specification.

My invention relates to improvements in machines for packing powdered or mastic material, and has particular reference in the embodiment herein shown and described, to a machine for packing powdered, granular, or mastic material into the containing casings of electrical batteries known as dry cells, although obviously the teachings of my invention herein disclosed are applicable to the packing of all sorts of materials in various styles of receptacles.

In general the object of my invention is to provide a machine which will automatically pack powdered or mastic substances into suitable receptacles, such as battery cells, but more specifically an object of the invention is to provide a device of the character described whereby the material will be packed into the receptacle under pressure throughout.

Another object of my invention is to provide a machine largely automatic in its operations which can be readily operated by unskilled labor.

Other and further objects will become apparent to those skilled in the art from the following description taken in conjunction with the accompanying drawings, showing in some detail an operative machine constructed in accordance with my invention.

Figure 1:
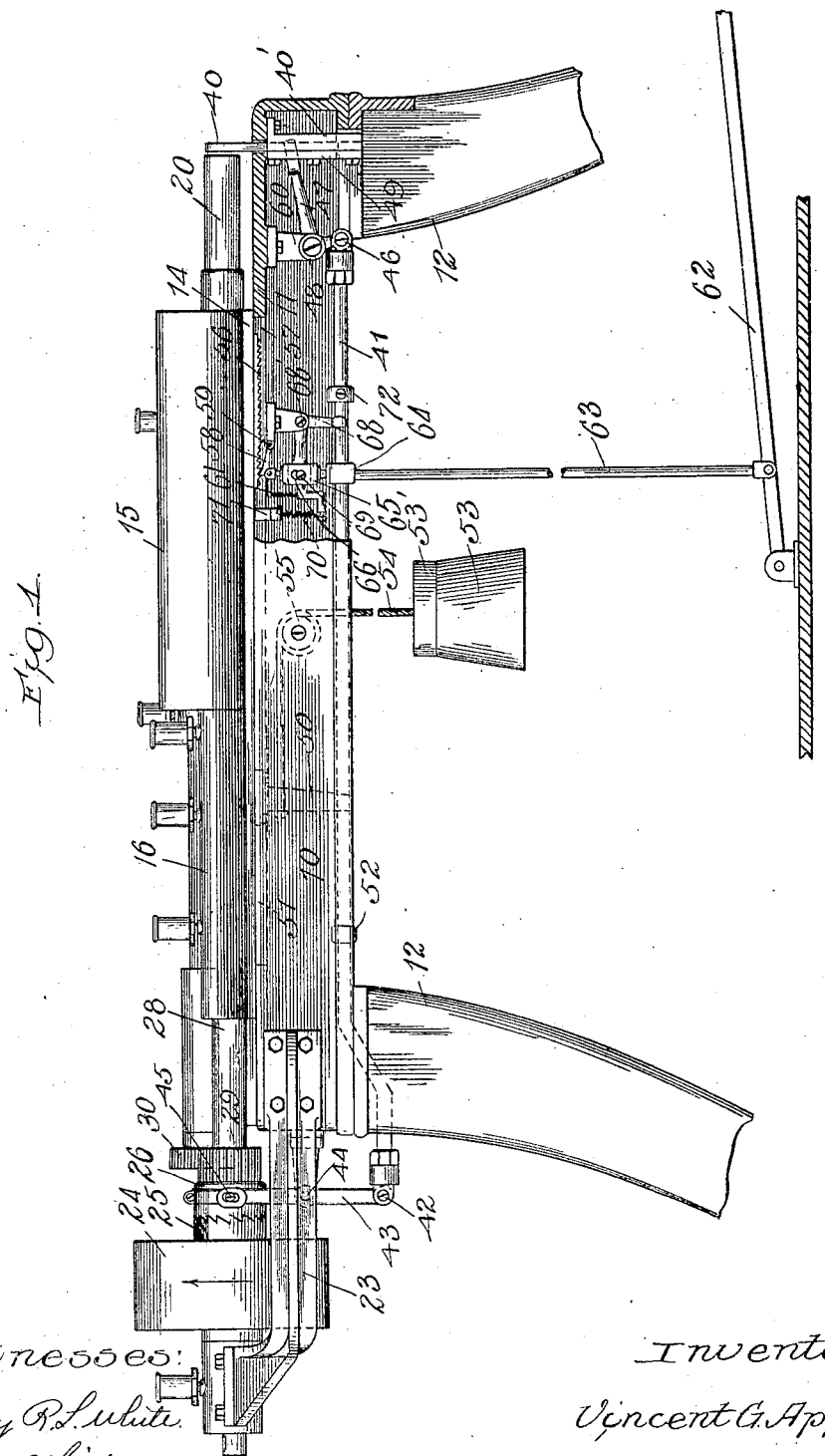
Figure 2:
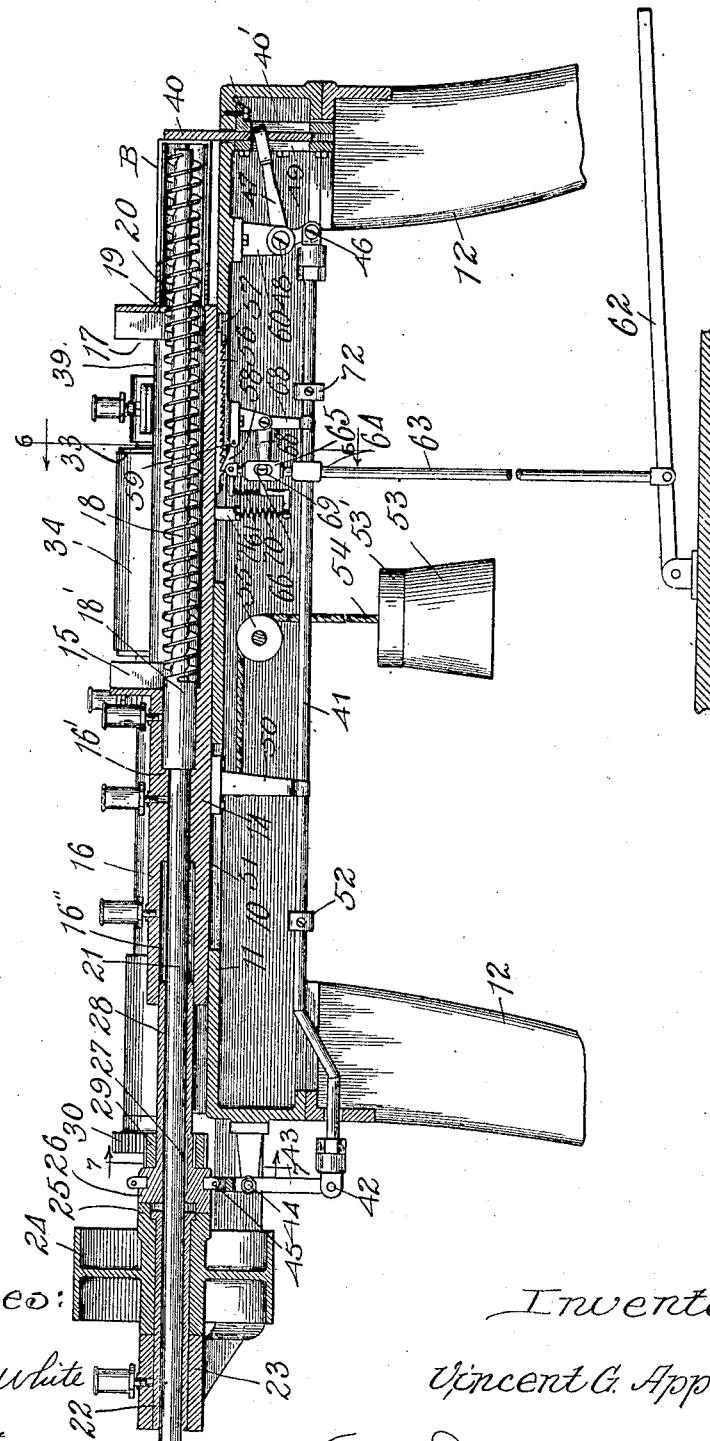
Figure 3:
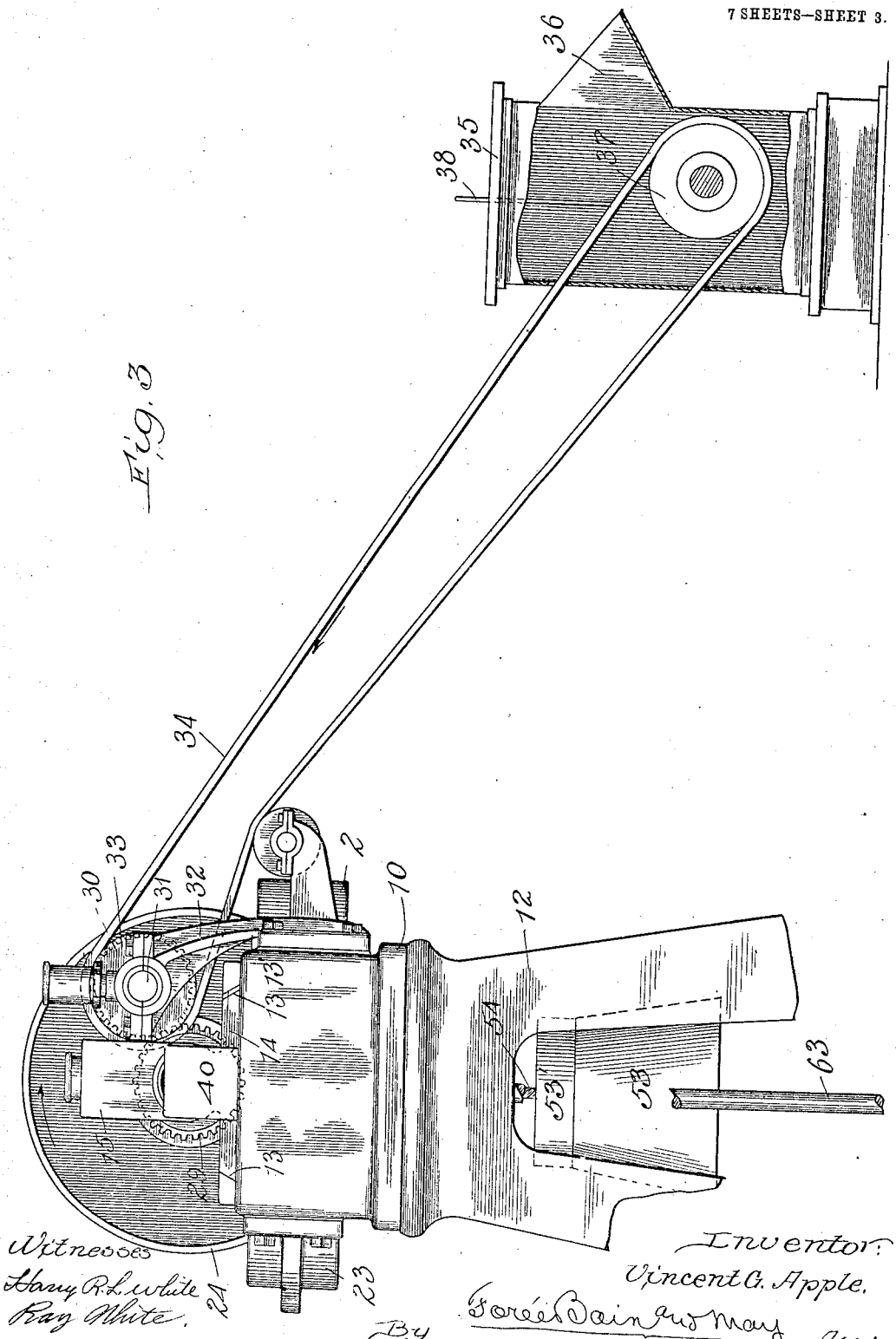
Figure 4:
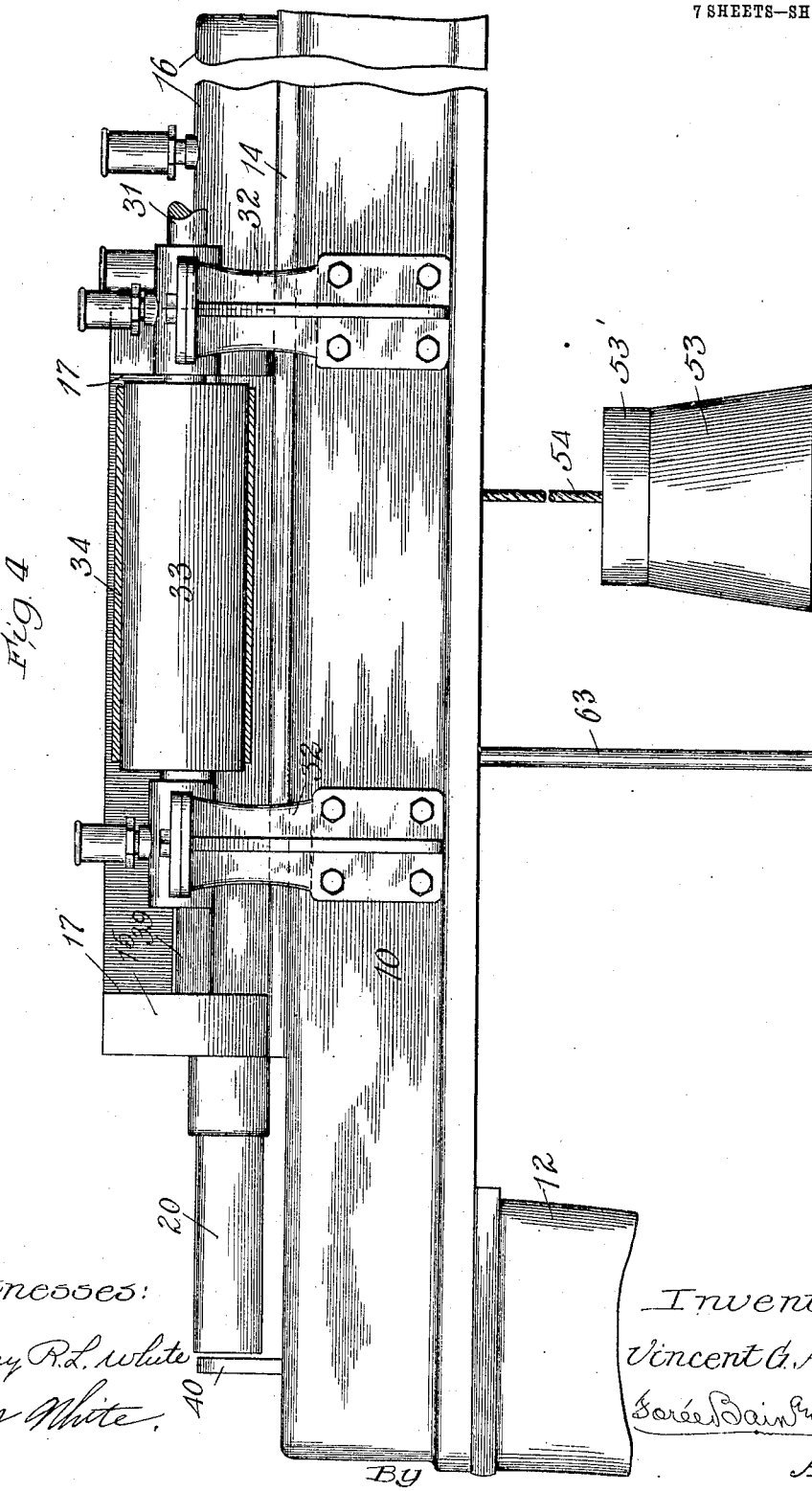
Figure 5:
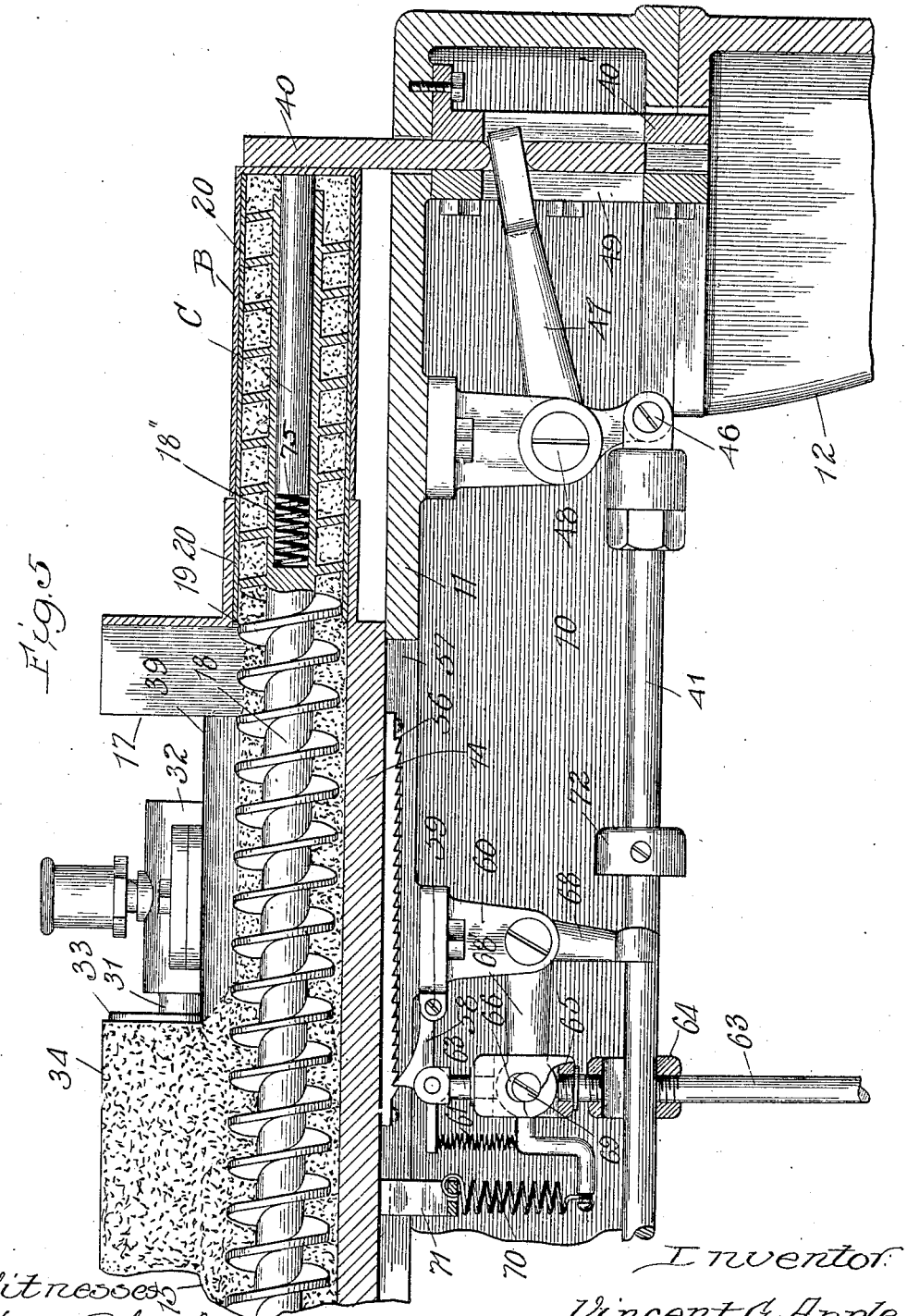
Figure 6:
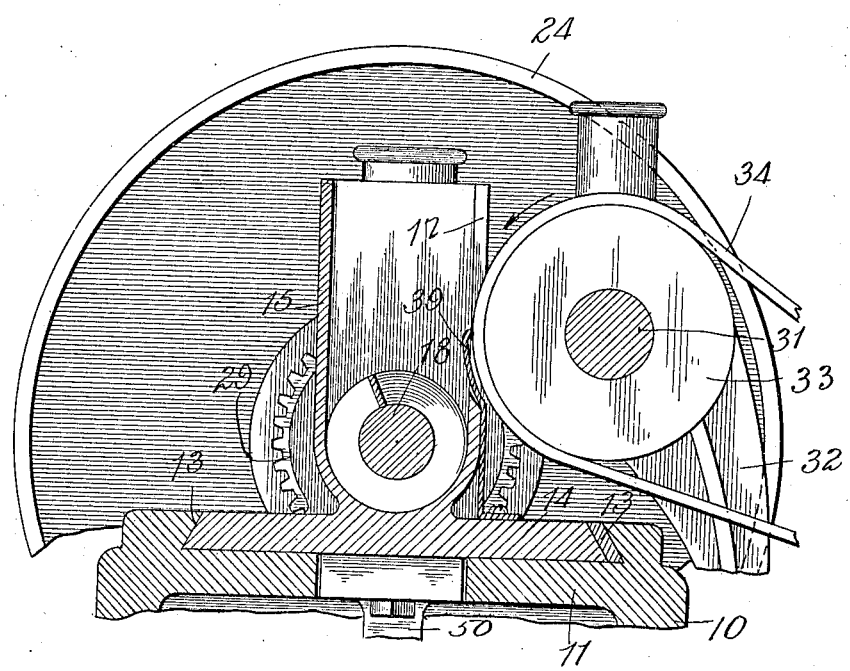
Figure 7:
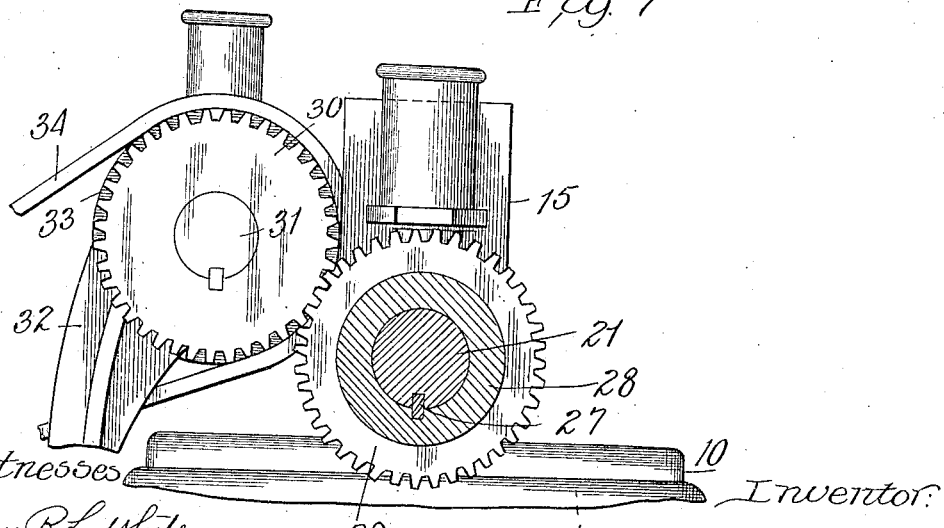

In said drawings: Figure 1 is a side elevation of the machine with parts broken away. Fig. 2 is a central, longitudinal, vertical section through the machine. Fig. 3 is an end view thereof looking from the right end of Fig. 1. Fig. 4 is an elevation of a fragment of the machine looking from the side opposite that shown in Fig. 1. Fig. 5 is an enlarged detail of a portion of the mechanism. Fig. 6 is a transverse section on line 6—6 of Fig. 2, and Fig. 7 is a sectional detail on line 7—7 of Fig. 2. Figs. 8 and 9 are diagrammatic views showing different operations of the machine.

Throughout the drawings like numerals of reference refer always to like parts.

In the drawings 10 indicates in general a frame, which consists of a platform or table, 11, suitably supported as upon the legs 12, provided on its upper surface with a guideway 13 extending longitudinally of the frame.

14 indicates in general a carriage mounted for longitudinal movement in the guide 13 and comprising in general a hopper 15 and a shaft bearing portion 16.

13' indicates a gib for taking up the play of the carriage in its guide 13.

The hopper 15 is preferably relatively tall and narrow, as shown in section in Fig. 6, and is provided with a rounded bottom, and an opening 17 in one side, for purposes to be described.

18 indicates in general a conveyer screw, such as is called in the practical terminology of the art an "auger" extending longitudinally through the hopper, and having its thread fitted closely in the rounded bottom thereof, one extremity of said auger passing through an aperture 19 in the end of the hopper projecting therebeyond toward what I may term the front end of the machine. Surrounding the projecting portion of the auger is a thin hollow mandrel 20 of suitable shape to receive and support the battery casing B, or other receptacle to be filled.

At its opposite end the auger terminates in an unthreaded portion 18' rigidly secured to a shaft 21 of smaller diameter than said portion 18', and finding an end bearing for the annular end portion surrounding said shaft 21, against a shoulder 16' formed in the shaft-bearing portion 16 of the carriage 14. The shaft 21 extends longitudinally the remainder of the length of the machine, and at its end finds loose bearing in a sleeve 22, suitably supported as by bearing bracket 23, and carrying a driving pulley 24, having fixedly connected therewith one element 25 of a clutch of any suitable description, such as the positive tooth clutch shown. Mounted for reciprocation relative thereto, upon the shaft 21, is the opposite clutch member 26, having a sliding but non-rotatable connection with the said shaft as by a key 27 fixed to the clutch member and taking into a slot in the shaft. The hub of the clutch member 26 is extended to form a long bearing 28 taking into a suitable recess 16" formed therefor in the bearing member 16 of the carriage 14, so that said bearing member may slide relative to the clutch. It will thus be seen that the driving mechanism of the auger 18 is arranged to rotate the auger when the clutch 25—26 is closed, but to permit axial or longitudinal movement of the auger relative to the bodily stationary driving mechanism.

Rigidly fixed to the sleeve 28 of the clutch member 26 is a wide faced gear wheel 29, meshing with the narrower gear wheel 30 upon a countershaft 31, in such manner that the movement of the clutch member 26 to and from to open and closed position does not cause the disengagement of the gears 29 and 30.

The counter shaft 31, whereon the gear 30 is secured against rotation, extends longitudinally between suitable brackets 32—32, and carries a conveyer roll 33 of less length than the opening 17 of the hopper 15, and so disposed in relation to said opening that material carried by the belt 34 running over said roll may be delivered into the hopper. The relative lengths of the roll 33 and the opening 17 of the hopper should be such as to permit the full movement of the hopper during the operation of the machine without interference with the roll. As best shown in Fig. 3, the belt 34 extends to a source of material supply 35, comprising in general an open mouthed hopper 36, a roll 37 for the belt, and a gage 38, adjustable in relation to the carrying surface of the belt to regulate the amount of material which may be conveyed by the belt, in a manner which will be well understood by those skilled in the art. When the material employed is mastic or liable to stick to the conveyer belt, I prefer to provide in conjunction with the hopper a scraper 39 in the form of a suitably shaped spring plate having its edge pressing against the belt 34, where it enters the aperture 17 of the hopper.

40 indicates a stop or abutment against which the receptacle may bear during the filling operation to prevent it from moving axially under the pressure applied by the operation of the auger 18. The stop 40 is vertically movable to and from operative position in a suitable guide 40', and I provide in my machine for the automatic actuation of the abutment 40, and of the movable clutch member 26, to withdraw the abutment and open the clutch when the carriage and conveyer reach their limit of movement away from the stop 40, or as I will term it, of rearward movement.

41 indicates the controlling rod extending longitudinally of the machine, and disposed for longitudinal reciprocation, said rod being at one end connected as at 42 to a clutch shipper lever 43, pivoted as at 44 in suitable bearings, and at its upper end pivotally connected to the movable element of the clutch 26, in the usual manner as shown at 45. At its opposite end the controlling rod 41 is pivotally connected as at 46 to the short arm of the bell crank lever 47, pivoted as at 48, and having its longer arm taking through a slot 49 in the guide 40' and operatively associated with the stop 40 to vertically move the same into and out of axial alinement with the auger 18.

It will now be apparent that movement of the controlling rod toward the rear end of the machine simultaneously draws the abutment 40 to position below the top of the table and opens the clutch.

50 indicates a depending arm secured to the under side of the carriage 14 and taking through a suitable slot 51 provided therefor in the table. The lower end of the arm 50 is arranged for contact with an adjustable collar 52, provided upon the controller rod 41 in such position that the collar 52 is engaged by the arm 50, and the controller rod thereby moved rearwardly, just as the carriage reaches its rearward limit of operative movement.

I provide means for maintaining constant pressure upon the auger and its carriage, tending to resist movement of the auger toward the rear of the machine and restore it to its forward limit of movement whenever so moved. Such means in the embodiment shown comprises a weight 53 secured to a cord 54 running over a pulley 55 suitably mounted in the frame, and secured to the arm 50. It will be apparent that said weight constantly tends to move the carriage toward the forward end of the machine, and that the tension exerted may be varied by varying the number of removable weights 53' applied to the cord. As best shown in Fig. 5, I also provide releasable means for preventing such return movements of the carriage and auger, such means in the specific embodiment shown comprising a rack 56, secured to the under side of the carriage and taking through a suitable aperture 57 provided therefor in the bed or table of the machine, and associated therewith, a pawl 58, adapted to engage said rack to prevent the forward movement of the same, and normally held in position to engage the rack. The pawl, 58, is pivotally mounted as at 59 in a suitable bracket 60, and is maintained in engagement with rack 56 under tension of an expansion spring 61, arranged as hereafter described.

For disengaging the releasable pawl 58 from the rack 56 I provide a starting lever 62 with which is connected a link 63 pivotally connected to said pawl at its upper end, and intermediate its ends provided with a collar 64 encircling the rod 41 so loosely as to permit vertical play of the link 63, and with a yoke 65 open longitudinally of the machine and having the lateral slot 66.

Pivotally mounted on the bracket 60 is a bell-crank lever 68, the shorter arm of which extends into operative proximity to the operating rod 41, and the longer arm of which, indicated at 68' takes through the opening in the yoke 65, and is provided with a lateral pin 69 engaging the slot 66. The spring 61 for the pawl 58, bears upon the upper surface of the arm 68' and an oppositely acting or contracting coil spring 70 is connected between the extremity of the arm 68' and a suitable support 71. A collar 72 is provided upon the operating rod 41 in position to be engaged and moved forwardly by the arm 68 of the bell crank when the longer arm 68' thereof is depressed.

In the use of my machine for packing battery cells it is of course desirable that provision should be made for inserting the central carbon in the cell, and to this end I make the filling extremity of the auger 18 hollow, as indicated at 18″ in Fig. 5, the recess being of proper diameter to receive the carbon C to be employed, and in such recess I arrange a coiled spring 75 arranged to press upon the end of the carbon C. tending constantly to thrust the same outward from the auger.

The machine which I have herein shown is obviously best adapted for round carbons, but it will be apparent that a suitable holder might be employed to take a flat or other shaped carbon, the holder fitting in the central bore of the auger.

To prevent the deterioration of the machine, due to the corroding effect of the acid battery compound, I prefer that the surfaces of the hopper, auger and mandrel be coated with porcelain, or other acid resisting composition.

Having thus described my machine, I will now describe its operation in the filling of battery cells.

Assuming the parts to be in the position shown in Fig. 2, that is to say, with the battery cell B in place upon the mandrel, the carbon C in the bore 18″, the stop or abutment 40 is raised to operative position and the clutch closed to connect the auger shaft with the pulley for rotation, it will be apparent that the rotation of the auger in proper direction, as indicated by the arrow on pulley 24, forces the powdered or mastic material from the hopper 15 through the hollow mandrel 20 and into the battery cell around the carbon C. As soon as this packing feed commences the auger starts to move rearwardly, driving with it the sliding carriage, the movement of said parts being resisted by the weight 53 which opposes a constant resistance to such movement, and thereby determines the pressure under which the material is packed in the battery casing. When now the casing is practically filled to the proper degree, the arm 50 of the carriage strikes the collar 52 upon the operating rod 41, and moves said rod rearwardly, thereby throwing the parts to position shown in Fig. 8, the rod acting as heretofore described through its proper connections at opposite ends, to open the clutch and depress the stop 40, so that the filled battery cell may be removed from the machine and a new casing slipped upon the mandrel. The movement of the operating rod also brings the collar 72 into engagement with the short arm of the bell crank lever 68, and it will be noted that the slot and pin connection 66, 69, of the bell crank lever with the starting rod 63 is such as to permit some slight play of the lever should the collar 72 be so set as to strike the crank arm 68 before reaching its exact limit of movement. It will be noted that this automatic movement does not release the pawl 58 from its ratchet 56, so that the carriage and auger are held in their rearmost position until voluntarily released by the operator. When now the fresh battery casing is in place, and the operator desires to start the machine, he depresses the lever 62, which through its direct link connection 63 depresses the pawl 58, throwing it out of engagement with its rack 56 and freeing the carriage and auger to slide to forwardmost position under the influence of the weight 53. This movement of the foot lever 62 also causes the top of the slot 66 to engage the pin 69 of the bell crank lever 68, depressing the longer arm of the lever against the tension of its spring 70 and forcing its shorter arm forward so that it presses the collar 72 forward to initial position, this operation of the parts being best illustrated in Fig. 9. This forward movement of the operating rod 41 restores the abutment 40 to operative position and closes the clutch to again start the machine in operation. Removal of the foot of the operator from the lever 62 furthermore, permits the strong spring 70 to instantly restore the lever to raised position and the pawl to engage with its rack 56. It is to be seen, however, that as the pawl mechanism operates only in one direction, any slowness of the operator in releasing the starting lever has no detrimental effect upon the machine.

It will be observed that while the auger, the hopper and the mandrel all move rearwardly together, the carbon C of the battery cell is prevented from being carried with the auger by the action of the spring 75 which presses it constantly against the bottom of the battery casing until sufficient material has been packed around the carbon to insure its maintenance in the cell against the frictional pull of the auger wherein it fits.

It will be understood of course, that as long as the machine is running material is fed through the hopper 15 by the conveyer belt 34, by the agency of which the material is brought from the source of supply 35, and as the driving gearing of the roll 33 is controlled by the clutch 25—26, the conveyer is caused to operate only when the auger is in rotation.

While I have herein described in some detail, for purposes of a full disclosure, an operative embodiment of my invention particularly adapted for a specified use, it will be understood that numerous changes in the specific construction might be made in the embodiment and adaptation of my invention without departure from its spirit and scope, and I do not desire to be understood, therefore, as limiting my invention in its broader aspect to the specific construction shown and described.

Having thus described my invention, what I claim and desire to secure by Letters Patent, of the United States, is:

1. In a machine of the character described, an axially movable packing auger, means for supplying material to the auger movable therewith, and means for rotating the auger.

2. In a machine of the character described, the combination of an axially-movable packing auger, a hopper wherein part of said auger works, longitudinally movable with the auger, and means for rotating the auger.

3. In a machine of the character described, the combination of a frame, a carriage mounted to slide longitudinally in said frame, a hopper carried by said carriage, an auger extending into said hopper and movable with the carriage, and means for rotating the auger.

4. In a machine of the character described, the combination of a frame, a carriage mounted to slide longitudinally in said frame, a hopper carried by said carriage, an auger associated with said hopper to receive material therefrom, said auger being movable with said carrier, and having one end projecting from said hopper for coaction with a receptacle to be packed, means for holding against longitudinal movement relative to the frame a receptacle to be packed, and means for resisting movement of the auger away from said receptacle.

5. In a machine of the character described, the combination of a frame, a carrier mounted for longitudinal movement in said frame, a rotatable auger associated with said carriage for axial movement with said carriage, and a hollow mandrel carried by said carriage for positioning the receptacle to be packed relative to the auger.

6. In a machine of the character described, the combination of a frame, a carriage mounted for longitudinal movement in said frame, an auger extending through said carriage and arranged to move axially with the carriage, means for supplying material to said auger, a hollow mandrel surrounding the free extremity of the auger for positioning a receptacle relative to said auger, said mandrel being associated with the carriage movement therewith, and means for preventing longitudinal movement of a receptacle associated with said mandrel relative to the frame.

7. In a machine of the character described, the combination of a frame, an axially movable auger in said frame, means for rotating said auger, means tending to return said auger from one limit of its axial movement to the other limit, and releasable means for normally preventing such return of the auger.

8. In a machine of the character described, the combination of a frame, a rotatable, axially movable auger mounted in said frame, means tending to maintain said auger in, or move it to one limit of axial movement, and releasable means for preventing the return of said auger to said limitational position when moved therefrom, said means comprising a rack and a movable pawl, one operatively connected with the auger and the other operatively connected with a relatively stationary part of the machine.

9. In a machine of the character described, the combination of a frame, a rotatable auger axially movable therein, means for driving the auger in rotation, means for controlling the connection of the driving means and auger arranged to automatically break such driving connection, when the auger reaches one limit of movement, and means arranged for control by an operator for returning the auger from said limit of movement to the other.

10. In a machine of the character described, the combination of the frame, a rotatable auger axially movable within predetermined limits, means for driving the auger in rotation, means for controlling the connection of said driving means and auger arranged to automatically break such driving connection when the auger reaches one limit of axial movement, and to restore such connection when the auger reaches its other limit of axial movement, and means, arranged for control by an operator, for returning the auger from one limit of movement to the other.

11. In a machine of the character described, the combination of a frame, a rotatable auger movable axially in said frame, a stop for receptacles to be filled, movable into and out of operative position, means for driving the auger in rotation, and automatic means for moving the stop to and from operative position in proper timed relation to axial movement of the auger.

12. In a machine of the character described, a packing auger, a means for axially positioning a receptacle to be packed relative to the auger, one of said parts being axially movable relative to the other, and the positioning means being movable to and from operative position, and automatic means for moving said positioning means to and from inoperative position when the auger and stop reach axial positions in predetermined relation to each other.

13. In a machine of the character described, a frame, an auger mounted for rotation in the frame, a stop for axially positioning a receptacle relative to the auger, said stop being movable into and out of operative relation to the auger, and said auger and stop being relatively movable axially of the auger, and means controlled by the auger for moving the stop to and from operative position.

14. In a machine of the character described, a bed plate, a carriage movable longitudinally of the bed plate, a rotatable packing auger axially movable with the movements of the carriage, a shaft connected with said auger, extending beyond the carriage, a clutch member loosely rotatable relative to said shaft, a coacting clutch member non-rotatable relative to said shaft, a movable stop for axially positioning the receptacle, a rod operatively connecting the stop and the movable clutch member, and a part operatively associated with the carriage coöperating with the rod to automatically move the same to transmit operating power to the clutch and stop when the carriage reaches a predetermined position.

15. In a machine of the character described, a frame, a carriage movable therein, a rotatable conveyer, means for driving said conveyer in rotation including a clutch, means for operating the clutch, means associated with the carriage for actuating said operating means to open the clutch when the carriage reaches one limit of movement, means tending to return said carriage from said limit of movement in the opposite limit of movement, and means, under the control of an operator, for releasing the last said means, and operating the clutch controlling mechanism to close the clutch.

16. In a machine of the character described, a packing auger, an open hopper into which said auger extends, a source of material supply, a conveyer for transferring the material from the source of supply to the hopper, and a scraper associated with the hopper to scrape material from the conveyer to cause it to fall into the hopper.

17. In a machine of the character described, a packing auger, a hopper for supplying material thereto, a conveyer for conveying material to the hopper, a continually running driving member, a shaft for driving the auger, means for connecting or disconnecting the shaft and the continually running means, and means for driving the conveyer associated with said auger shaft for rotation simultaneously therewith.

18. In a machine of the character described, the combination of a rotatable auger, a stop for receptacles to be filled, one of said elements being movable relative to the other in a direction axial of the auger, and the stop being movable in a direction transverse to the direction of the auger; means for driving the auger in rotation, and automatic means for moving the stop transversely of the axis of the auger in proper timed relation to axial movement of the movable element.

In testimony whereof I hereunto set my hand in the presence of two witnesses.

VINCENT G. APPLE.

In the presence of
  L. M. ARNOLD,
  S. M. PECK.